Dec. 10, 1929. P. F. MULCAHY ET AL 1,739,083
AUTOMOBILE THEFT PREVENTING DEVICE
Filed May 15, 1929
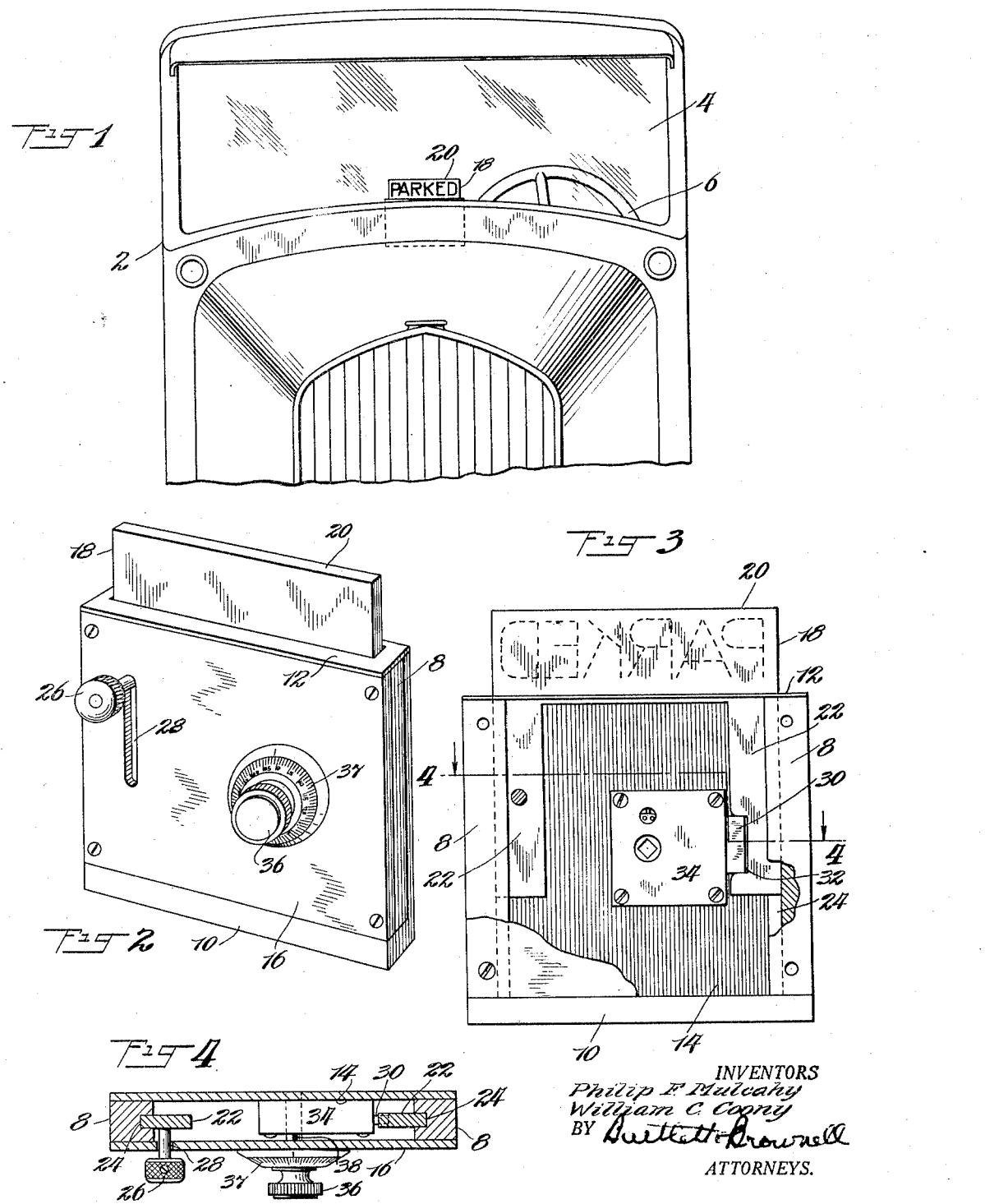
INVENTORS
Philip F. Mulcahy
William C. Coony
BY Buttett Brownell
ATTORNEYS.

Patented Dec. 10, 1929

1,739,083

UNITED STATES PATENT OFFICE

PHILIP F. MULCAHY AND WILLIAM C. COONY, OF NEW YORK, N. Y.

AUTOMOBILE THEFT-PREVENTING DEVICE

Application filed May 15, 1929. Serial No. 363,240.

Experience has shown that in urban communities the majority of cases of successful theft of automobiles has been of those that are left parked by the curb or in driveways. Various devices have been proposed for locking the doors, ignition, transmission and other parts of an automobile, but such devices have not proven satisfactory. Moreover, in some communities fire or police regulations forbid the parking of an automobile with the doors locked.

The principal object of the present invention is to provide a device which, upon parking the automobile, the owner or driver may operate to expose a suitable signal to view and lock it in exposed position, so that in case the automobile is unlawfully driven away a policeman or other person seeing it pass with the signal in position are at once notified that the automobile is being unlawfully driven, the signal preferably being such that a traffic officer may plainly see it as the automobile approaches from a distance.

Another object of the invention is to provide a theft preventing device of the character indicated which is of simple, strong and durable construction, easily operated by an authorized person, and reliably safeguarded against operation by an unauthorized person.

These and other objects of our invention and features whereby they may be attained will be readily understood from the following description and accompanying drawings, in which:

Figure 1 is a front view of the upper portion of an automobile having our improved theft preventing device applied thereto with the signalling means thereof projected so as to be exposed to view through the wind shield of the automobile;

Fig. 2 is a view in perspective of the device;

Fig. 3 is a front view of the device with a portion of one side of the casing thereof and certain other parts removed; and Fig. 4 is a sectional plan view taken on the line 4—4 of Fig. 3.

Our improved device is illustrated in Fig. 1 of the drawings applied to an automobile 2 having the usual wind shield 4, and steering wheel 6. As shown, the device is provided with a thin square casing having vertical side pieces 8, a bottom 10 secured thereto, a top 12 secured on the upper ends of the side pieces 8 and front and rear side plates 14 and 16. The top 12 is provided with a slot through which a slide 18 extends. This slide formed from a flat plate is substantially of inverted U-form, it having an upper end portion 20 and vertical legs 22. The longitudinal edges of the slide are received in guiding grooves 24 in the side pieces 8 so that the slide is smoothly guided. The slide is adapted to be projected so as to expose the end portion 20 above the casing by means of a knob 26 whose shank extends through an elongated slot 28 in the front wall of the casing. The slide is adapted to be locked in projected position by a lock bolt 30 which is projected into a locking recess 32 in one leg of the slide. The actuating mechanism for the bolt may be of any suitable construction and, as shown, is enclosed within the casing 34 secured to the back wall of the lock case. The bolt actuating mechanism is preferably controlled by means of a common type of combination lock mechanism having a knob 36 and a dial 37, the knob shank 38 extending through the lock case 34 and being suitably connected with the usual roll backs (not shown) for operating the lock bolt.

The front side of the end portion 20 of the slide may bear the word "Parked" or other suitable indicia.

The device may be secured on the cowlboard of the automobile in a suitable position so that when the slide is projected and locked in position, the projected or signal end of the slide may be plainly visible through the wind shield of the car.

With this construction when the car is parked at the curb or other parking place the owner or driver may project the slide 20 and by means of the combination lock mechanism and bolt lock the slide in projected position. When the slide is thus locked in projected position, in case a person unlawfully drives away with the automobile, the word "Parked" on the projected end of the slide will be plainly visible at a distance so that a traffic officer or other person may be put on his guard as he sees the automobile approaching. The owner or lawful driver would of course retract the signal before driving the automobile.

The parts of the device are of strong and durable construction, the mounting of the signal slide is such as to ensure smooth and easy operation, and the provision of means for moving the slide independently of the lock mechanism permits the slide to be made of the necessary weight and strength.

If desired means may be provided for illuminating the signal in any suitable manner so that it may be visible after dark.

As will be evident to those skilled in the art, our invention permits various modifications without departing from the spirit thereof or the scope of the appended claims.

What we claim is:

1. A theft preventing device of the class described having, in combination, a casing for attachment to the cowl-board or other suitable part of an automobile, a member mounted to slide in said casing to project one end thereof beyond and retract it into the adjacent end of the casing, said member having a notch therein, lock mechanism comprising a lock bolt adapted to be projected into said notch when the slide is in projected position to lock the slide in this position, and manually operable means independent of the lock mechanism for moving the slide when unlocked into and out of said projected position.

2. A theft preventing device of the class described having, in combination, a casing for attachment to the cowl-board or other suitable part of an automobile, an inverted U-shaped slide mounted in the casing and adapted to be moved to project the upper end thereof above and retract it into the casing, one leg of said slide being provided with a notch, lock mechanism comprising a lock bolt arranged between the legs of the slide and adapted to be projected into said notch when the slide is in projected position to lock the slide in this position, one side of said casing having an elongated slot, and a knob having its shank extending through said slot and secured to the other leg of said slide for moving the slide into and out of projected position when said lock bolt is retracted.

3. A theft preventing device of the class described having, in combination, a casing for attachment to the cowl-board or other suitable part of an automobile, an inverted U-shaped slide mounted in the casing and guided at its longitudinal edges so as to permit it to be moved to project the upper end thereof beyond and retract it into the casing, the inner edge of one leg of said slide being provided with a notch, lock mechanism comprising a lock bolt adapted to be projected into said notch when the slide is in projected position to lock the slide in this position, and means independent of the lock mechanism for moving the slide when unlocked into and out of said projected position.

In testimony whereof, we have signed our names to this specification this 13th day of May, 1929.

PHILIP F. MULCAHY.
WILLIAM C. COONY.